United States Patent
Schmidt-Hattenberger (10) Patent No.: US 6,525,308 B1
(45) Date of Patent: Feb. 25, 2003

(54) APPARATUS AND METHOD FOR WAVELENGTH DETECTION WITH FIBER BRAGG GRATING SENSORS

(76) Inventor: Cornelia Schmidt-Hattenberger, Zerbster Strasse 56, D-12209 Berlin (DE)

( * ) Notice: Subject to any disclaimer, the term of this patent is extended or adjusted under 35 U.S.C. 154(b) by 0 days.

(21) Appl. No.: 09/208,385

(22) Filed: Dec. 9, 1998

(30) Foreign Application Priority Data

Dec. 10, 1997 (DE) ......................................... 197 54 910

(51) Int. Cl.[7] .............................................. G01B 11/16
(52) U.S. Cl. ........................... 250/227.23; 250/227.18; 356/32
(58) Field of Search ...................... 250/227.11, 227.14, 250/227.18, 227.23, 226; 356/32, 45, 408, 419; 73/800

(56) References Cited

U.S. PATENT DOCUMENTS

| | | | |
|---|---|---|---|
| 4,815,081 A | * 3/1989 | Mahlein et al. | ................ 372/20 |
| 5,319,435 A | 6/1994 | Melle et al. | |
| 5,426,297 A | 6/1995 | Dunphy et al. | |
| 5,469,265 A | 11/1995 | Measures et al. | |
| 5,493,390 A | 2/1996 | Varasi et al. | |

FOREIGN PATENT DOCUMENTS

GB  2 268 581 A  1/1994

OTHER PUBLICATIONS

"A Review of Recent Developments in Fiber Optic Sensor Technology," by Alan D. Kersey, Fiber Optic Smart Structures Section, Naval Research Laboratory, Washington, D.C.. Optical Fiber Technology 2, 291–317 (1996).

"In–Fibre Bragg Grating Sensors," by Rao, Yun–Jiang, Applied Optics Group, Physics Department, University of Kent at Canterbury, Kent. Meas. Sci. Technol. 8 (1997) 355–375.

"AOTF Interrogation Scheme for FBG [smart structures]" by A. Crespo. Proceedings of the SPIE, International Society for Optical Engineering (1996), vol. 2722, p. 107–10.

* cited by examiner

*Primary Examiner*—Stephone B. Allen
*Assistant Examiner*—Kevin Pyo (57) ABSTRACT

A wavelength detector configuration for detecting the Bragg wavelength of at least one Bragg grating in at least one FBG sensor, in which light reflected by each Bragg grating is conducted by fiber couplers into two detector channels, each containing a detector, whereby an evaluator device is provided to detect the signals of the detectors and to determine the Bragg wavelength from a quotient of the detector signals, the detectors of each pair of detector channels having narrowband spectral sensitivities that overlap with one another and who central wavelengths of maximum sensitivity span a wavelength range containing the Bragg wavelength of the corresponding Bragg grating.

17 Claims, 7 Drawing Sheets

APPARATUS AND METHOD FOR WAVELENGTH DETECTION WITH FIBER BRAGG GRATING SENSORS

FIELD OF THE INVENTION

The invention concerns an apparatus and a method for wavelength detection with fiber Bragg grating sensors (referred to hereafter as FBG sensors) and in particular a wavelength detector configuration for FBG sensors that are adapted to dynamic stretching or compression measurements (referred to hereafter as strain measurements).

BACKGROUND OF THE INVENTION

Among the numerous applications of fiber-optic sensors (cf A. D. Kersey in "Optical Fiber Technology", volume 2, 1996, p 291 ff), fiber sensors with integrated Bragg gratings take on special significance because of their general suitability for strain or temperature measurements. Each Bragg grating in a FBG sensor reflects light with a characteristic Bragg wavelength that is dependent on parameters of the grating integrated into the fiber and thus on changes in the length of the fiber, eg through compression, strain or temperature effects. FBG sensors are used in construction engineering, for example, to detect structural stress.

It is known that a plurality of Bragg gratings with different characteristic Bragg wavelengths can be arranged in an optical fiber and sampled selectively by wavelength to enable a locally resolved measurement of stress, eg in a building structure. For stress measurement, a broadband light source radiates into the FBG sensor and the light, dependent on strain, reflected by each grating is detected. Depending on the detector system, the wavelengths of the reflected component signals are measured and thus the current strain parameter at the location of the particular grating is determined. Dynamic strain measurements require wavelength resolution of at least 50 picometers (pm) at frequencies up to 5000 Hz.

The detection or sampling schematics used to date for determining Bragg wavelengths were summarized by Y.-J. Rao in "Meas. Sci. Technol.", volume 8, 1997, p 355 ff. It is possible, for example, to detect Bragg wavelengths by interferometry (Fabry-Perot interferometer) or by dispersion (continuously tunable prism or grating spectrometers). These methods are unsuitable for dynamic strain measurements at the mentioned high frequencies. Furthermore, dispersive configurations are elaborate and not suited to simultaneously achieving the required wavelength and time domain resolution.

The method of socalled laser tracking does not use a broadband light source. Instead a laser of continuously tunable emission wavelength radiates into the FBG sensor and the reflection spectrum is cyclically sampled. This method presents disadvantages when using several Bragg gratings in an FBG sensor, because a relatively wide range of wavelengths must be sampled, which is difficult at the frequencies necessary for the dynamic measurement.

OBJECTS OF THE INVENTION

It is therefore an object of this invention to propose an improved wavelength detector configuration for determining Bragg grating reflection wavelengths that is simple in structure and suitable for dynamic measurements at high frequencies.

It is a further object of this invention to propose a simple extension to form a system for simultaneous detection of the Bragg wavelengths of a large number of Bragg gratings.

It is a further object of this invention to propose a method for application of such detector configurations.

It is a further object of this invention to propose a strain measurement configuration using such an improved wavelength detector configuration detector arrangement.

It is a further object of this invention to propose a method for operating said strain measurement configuration using such an improved wavelength detector configuration detector arrangement.

Other objects of the invention will become apparent to one of ordinary skill in the art from the following description.

SUMMARY OF THE INVENTION

The fundamental idea of the invention consists in providing, for each Bragg grating of an FBG sensor, two detectors with narrowband spectral sensitivity ranges that overlap, whereby the Bragg wavelength of the particular Bragg grating lies between the central wavelengths of the detectors corresponding to maximum sensitivity. The detectors, depending on their central wavelengths, are also termed shortwave or longwave detectors. In a ground state of the FBG sensor, in which this is unstressed or uncompressed, for example, or exhibits a fixed reference temperature, the shortwave and the longwave detectors receive a certain reference energy component. If the lattice constant of the Bragg grating reduces, the shortwave and longwave detectors receive more or less energy respectively compared to the particular reference energy component. This process reverses if the lattice constant increases. Thus, with suitable calibration, the wavelength shift on the Bragg grating can be determined from the change in the detector signal. Depending on the number of Bragg gratings arranged in series or parallel in one or more FBG sensors, a large number of such narrowband spectrally responsive detector pairs can be combined, each being attuned to one of the Bragg gratings. The spectral detector sensitivity is preferably implemented by connecting detector elements to a narrowband transmission filter, eg interference filter.

The invention also concerns a strain measurement configuration using such a detector arrangement, and a method for operating it.

BRIEF DESCRIPTION OF THE DRAWINGS

Other objects, features, and advantages will occur to those skilled in the art from the following description of a preferred embodiment and the accompanying drawings, in which.

DETAILED DESCRIPTION OF THE INVENTION

Figure 1A:
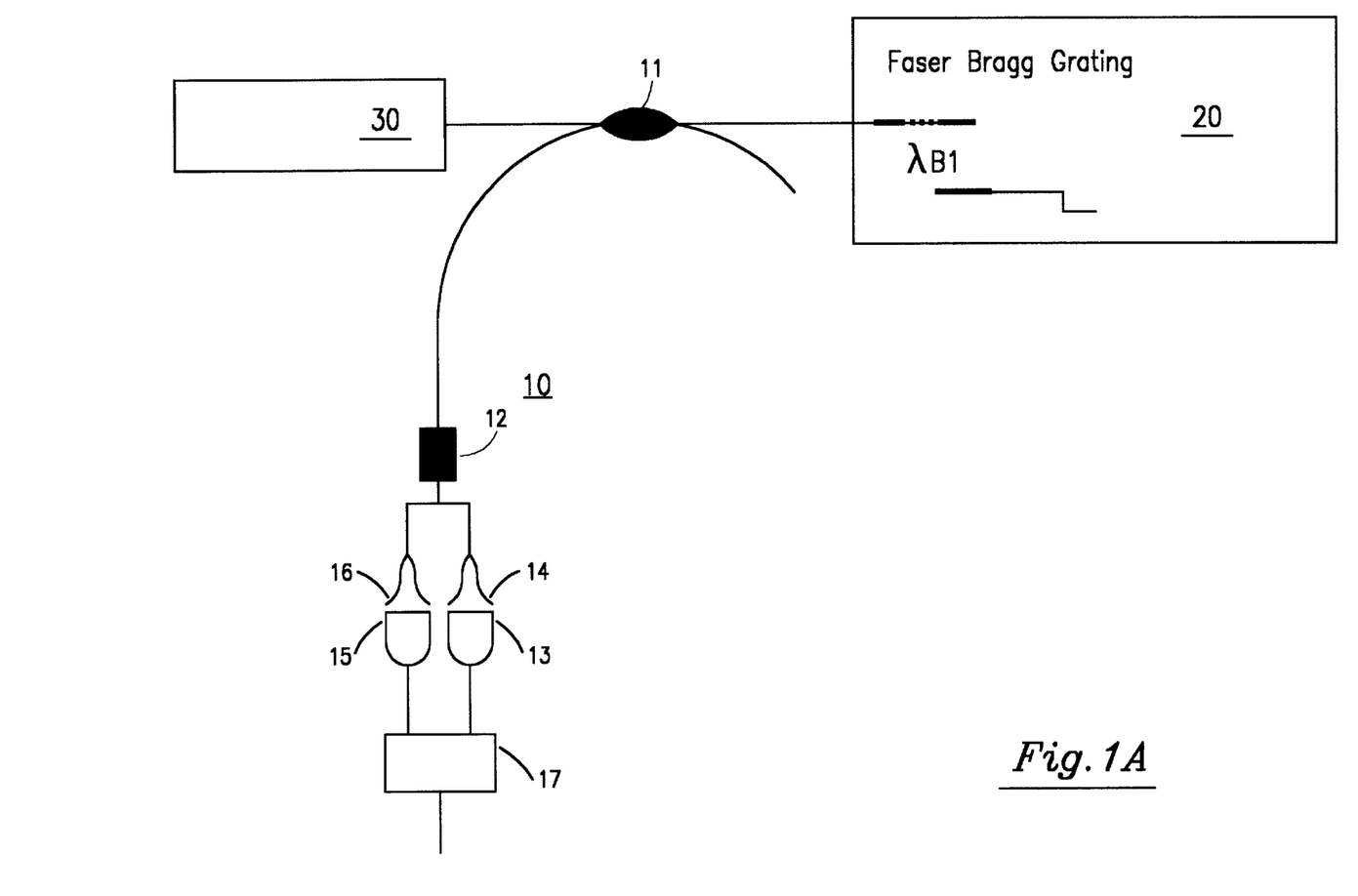
FIGS. 1A and 1B are schematics of wavelength measurement configurations with an FBG sensor and a detector in accordance with the invention.
Figure 1B:
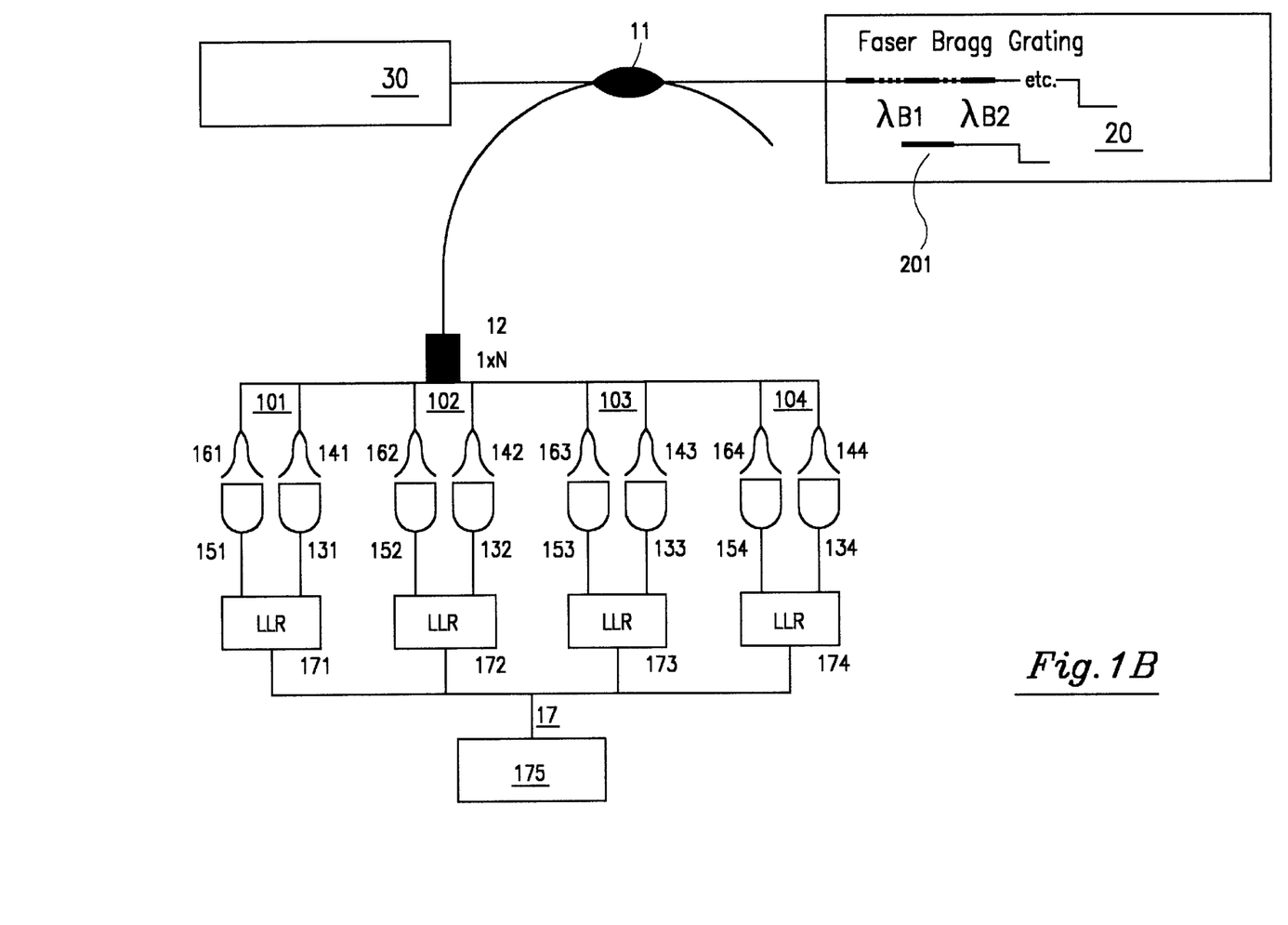

FIG. 1 shows two implementations of a wavelength detector configuration according to the invention, whereby the first example (FIG. 1A) is adapted to the measurement of the Bragg wavelength of a single Bragg grating in an FBG sensor, and the second example (FIG. 1B) concerns measurements of the Bragg wavelengths of a large number of Bragg gratings of one or more FBG sensors. The invention will be explained in what follows taking strain measurements as an example, although it is not restricted to this purpose but instead can be implemented in appropriate fashion for all other measurement applications of FBG sensors.

FIG. 1A shows a detector arrangement 10 according to the invention in conjunction with an FBG sensor 20 with a single Bragg grating, irradiated by a light source 30. The FBG sensor is a commercially available model offered, for example, by "3M Specialty Optical Fibers" (USA), "Bragg Photonics" (Canada) or "Innovative Fibers" (Canada). Any light source whose emission spectrum encompasses the Bragg wavelength range of the Bragg grating at maximum strain or compression is suitable as the light source 30. In the case of an FBG sensor with a single Bragg grating, the light source 30 may therefore also be a laser whose spectral line width is wide enough referred to the expected wavelength shift of the Bragg grating. Seeing as the Bragg wavelength generally exhibits a maximum shift of less than 10 nm, the spectral line width of the light source is to be selected accordingly. In the case of the FBG sensors, described below with reference to FIG. 1B, with a large number of Bragg gratings whose Bragg wavelengths differ from one another to achieve discrimination and thus local resolution, a light source that is correspondingly more broadband must be provided, eg a superluminescent diode with spectral line width of about 35 nm, or a fiber light source with spectral line width of about 50 nm, and a suitable central wavelength (typically about 1300 nm or 1500 nm).

Figure 4A:
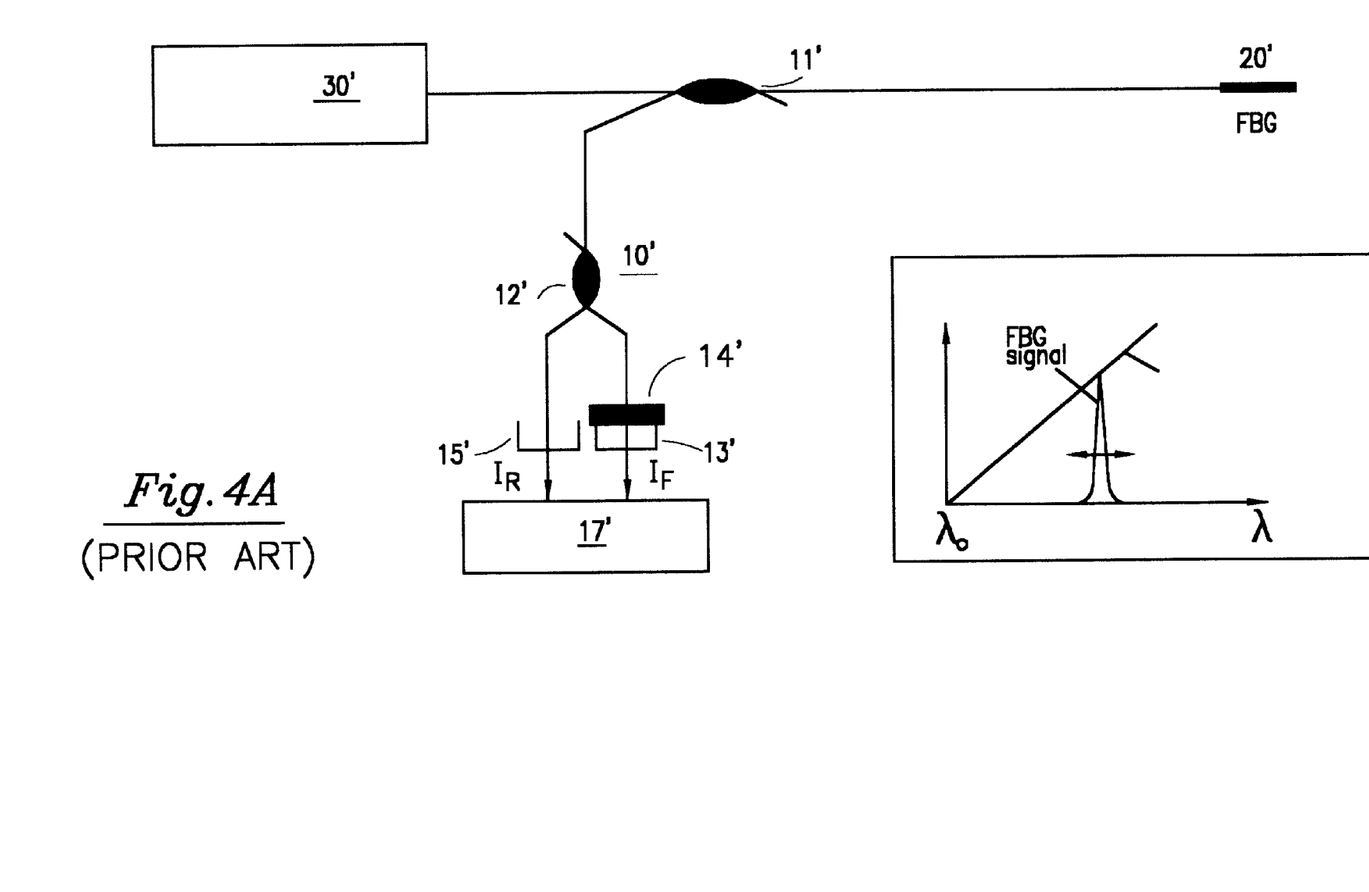
FIGS. 4A and 4B are schematics of prior art configurations for wavelength detection.

The basic structure of the detector arrangement 10 according to FIG. 1A is similar to the structure of the conventional detector according to FIG. 4A as far as the coupling out by the fiber coupler 11 of the light reflected by the Bragg grating is concerned and the splitting of the coupled out light to two detector channels by fiber coupler 12 is concerned. But, in contrast to the conventional arrangement, each detector channel is provided with a detector 13, 14 and 15, 16 with a narrowband sensitivity characteristic. The sensitivity characteristic of each detector forms a transmission band with a predetermined half-width value about a central wavelength of maximum transmission. The half-width value is greater than the half-width value of the light reflected by the Bragg grating. To achieve sufficient sensitivity, the half-width value of detector sensitivity may be wider than the half-width value of the reflected light by a factor of 2 to 5 (a factor of 3 is preferable) for example. The distance of the central wavelengths of the detector sensitivity ranges is selected as a function of the half-width values and maximum wavelength shifts of the Bragg wavelength so that the ranges of sensitivity overlap, and may be in the range from 0.8 to 10 nm for example, preferably at 1.6 to 2 nm.

Each detector with narrowband sensitivity is formed according to a preferred implementation by a detector element 13, 15, each provided with a narrowband filter 14, 16. The narrowband filter may be an interference filter with suitable transmission characteristic for example. Alternatively it is also possible to integrate the narrowband filter devices into the output channels of the fiber coupler 12. As another alternative it is possible to provide a fiber Bragg grating with a suitable spectral characteristic for each detector element instead of integrated or separate narrowband filters for spectral limiting of detector sensitivity. The advantage of this is purely fiber routing of measured light from FBG sensor to detector elements.

The detector signals of the detector elements 13, 15 are processed by an evaluator circuit 17, the functioning of which is explained below.

FIG. 1B shows the extension of the detector arrangement according to the invention for measurement of the Bragg wavelengths of a large number of Bragg gratings configured in series in one FBG sensor and/or in parallel in a large number of FBG sensors. FIG. 1B only shows one FBG sensor 20, the operation of several FBG sensors being correspondingly possible by using suitable fiber couplers to irradiate the sensors and to couple the reflected light out of the sensors.

The broadband light source 30 irradiates into the FBG sensor 20. In an untensioned ground state, each Bragg grating in the FBG sensor reflects light with a certain central Bragg wavelength that shifts to larger or smaller wavelengths depending on strain or compression. A temperature sensor 201 can also be provided in the FBG sensor 20 for the purpose of temperature compensation. Light with a spectral distribution composed of the momentary Bragg wavelengths of the Bragg gratings is reflected out of the FBG sensor or reflected back. The light reflected back is coupled into the distributor fiber coupler 12, a 1×N coupler, by the fiber coupler 11. The number N of pairs of detector channels to which the reflected back light is distributed by the fiber coupler 12 corresponds to the number N of Bragg gratings in the FBG sensor 20. N is 4 in the example illustrated. Each pair of detector channels 101 through 104 contains a detector pair 131, 141 and 151, 161 (up to 134, 144 and 154, 164), whereby each detector exhibits a narrowband sensitivity characteristic, as described above with reference to FIG. 1A. Accordingly, in the second example, the detector arrangement 10 includes an arrangement or an array of detector elements 131, 151 to 134, 154 (eg InGaAs detector elements), each provided with narrowband filters (eg interference filters) 141, 161 to 144, 164. But it is also conceivable to use Bragg gratings or to replace the combination of fiber coupler 12 with narrowband filters by a module with narrowband interference filters integrated into its output channels. An example of a coupler module of this kind is the telecom WDM module Alcatel 1913 WDM from "Alcatel Optronics" (Germany) or the eight-channel DWDM from "OCA" (USA).

The detector elements are connected to the evaluator circuit 17, which includes a lin-log ratiometer (LLR) 171 to 174 and a circuit for signal processing and computation of the measured value 175 for each channel 101 to 104.

The other components of a complete measurement configuration, eg control circuits, operating elements, indicator elements and the like, are not shown in FIG. 1. In a detector arrangement 10 according to the invention it is also possible to provide a temperature stabilizing device (not illustrated) to ensure stability of the narrowband sensitivity characteristic of the detectors.

Figure 2A:
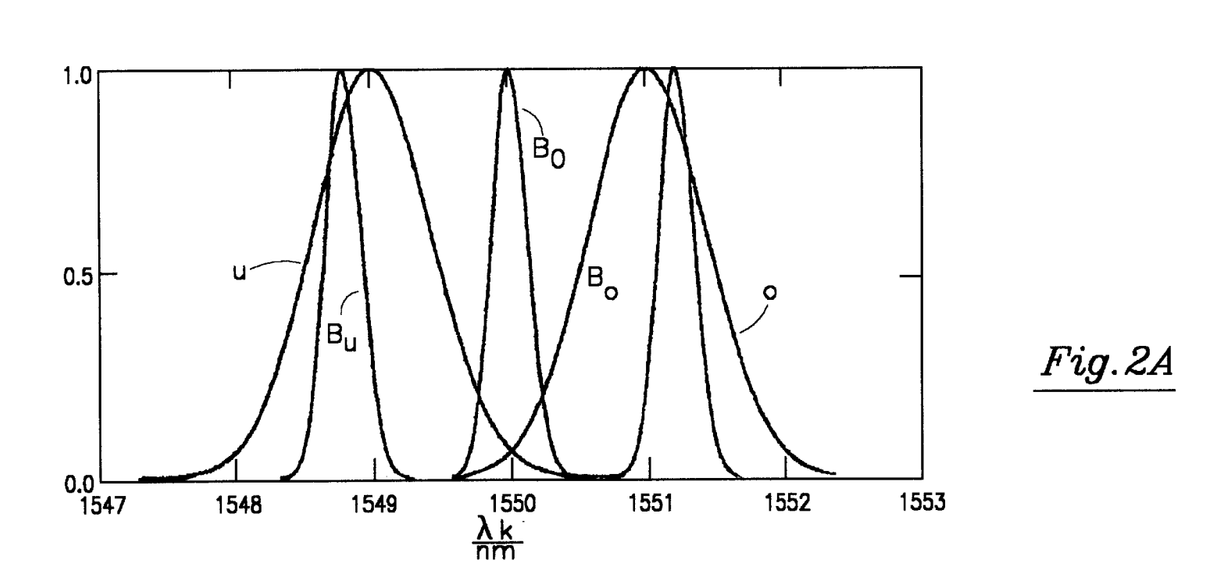
FIGS. 2A, 2B, 2C, and 2D are graphs that illustrate the relationship between Bragg wavelength and spectral detector sensitivity and which explain determination of a calibration curve.

FIG. 2A shows, as an example, the relation of the spectral detector sensitivity curves and the position of the light reflected by a Bragg grating in different states of the Bragg grating. The stated quantitative parameters can be modified according to application. The curves u and o represent the detector sensitivity of the shortwave and longwave detectors with central wavelengths of 1549 nm and 1551 nm respectively and half-width values of 1 nm. The curve $B_0$ identifies the spectral distribution of the light reflected by a Bragg grating with a Bragg wavelength of 1550 nm. The curves $B_u$ and $B_o$ mark the states of the Bragg grating at maximum compression (shortwave shift) and maximum strain (longwave shift), respectively. The half-width value of the reflected light is approx. 0.3 nm. As can be seen from FIG. 2A, the Bragg wavelength of the untensioned Bragg grating is preferably in the middle between the central wavelengths of maximum sensitivity of the detectors, whereby the ranges of sensitivity overlap.

The degree of overlap is selected as a function of application. With greater central wavelength distance, the resolution of wavelength measurement initially increases until the signal in the more weakly radiated channel falls off into the resolution limiting noise level of the particular detector. The overlap is selected with special emphasis on the required resolution and dynamic range parameters.

Assuming characteristic functions for the spectral distribution (i.e. Gaussian functions for the transmission of interference filters or for the reflection of Bragg gratings), a calibration curve can be computed on the basis of the relations illustrated in FIG. 2A that will allow determination of the momentary Bragg wavelength or of the shift in the momentary Bragg wavelength from the Bragg wavelength of the grating in the ground state according to the ratio of the signal amplitudes of two detector elements in a detector channel.

Figure 2B:
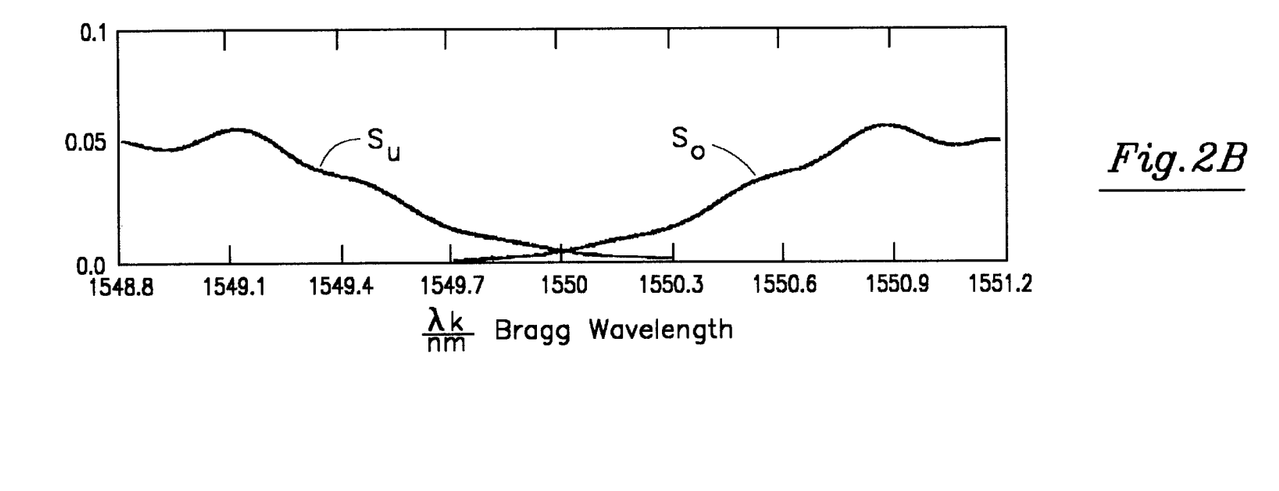
Figure 2C:
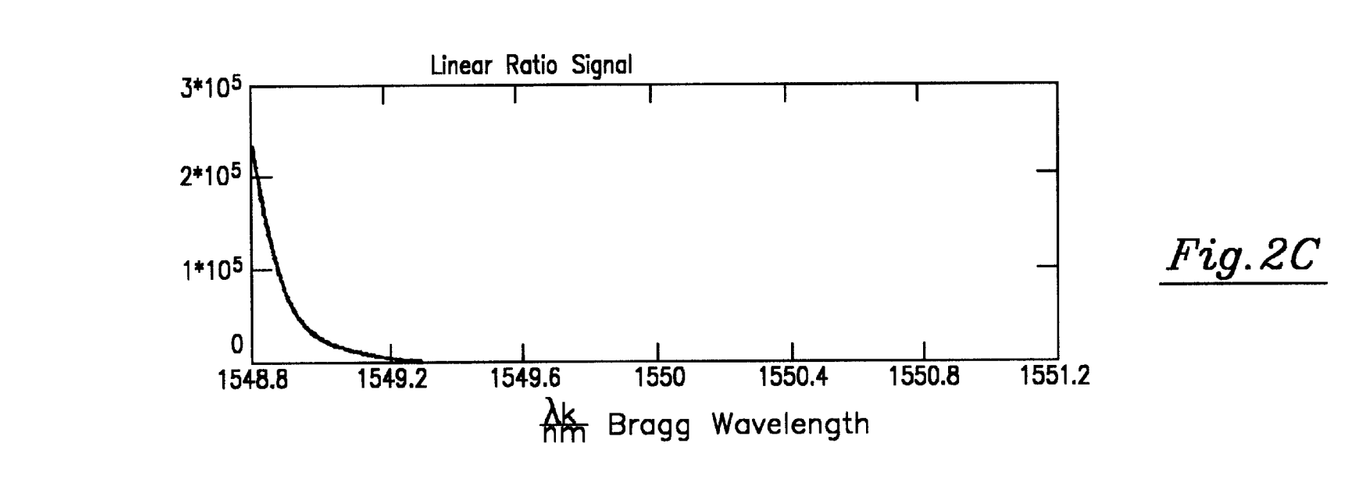
Figure 2D:
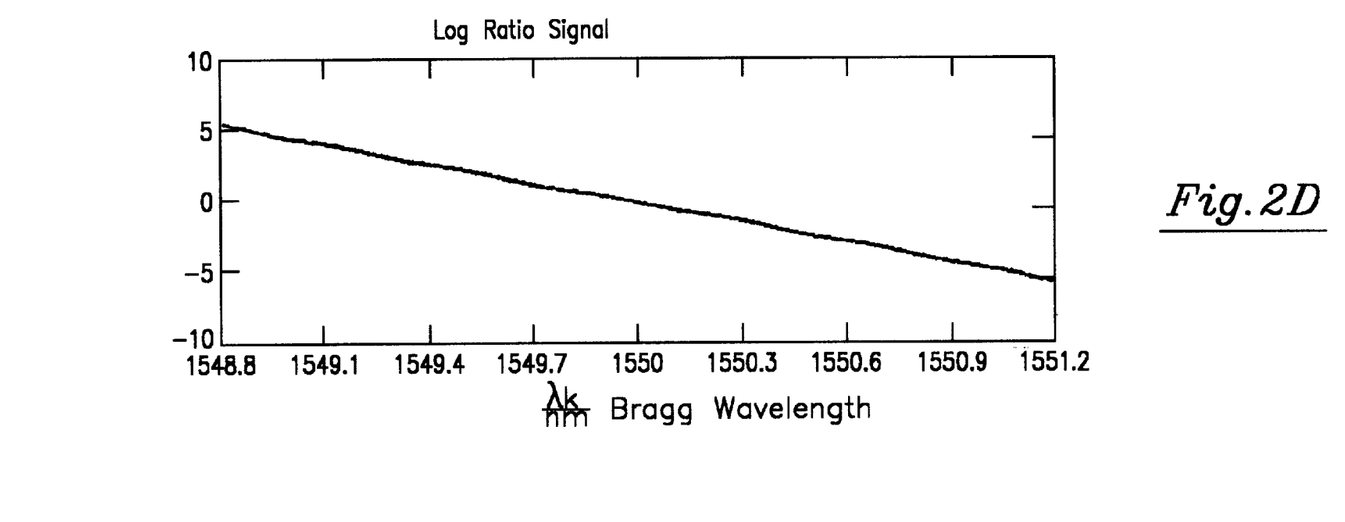

The signals $S_u$ and $S_o$ of the detector channels, each corresponding to a detector as a function of the momentary Bragg wavelength (see FIG. 2B), are produced as a (normalized) integral over the products of the curves u and o (see FIG. 2A) with the momentary spectral response of the reflected Bragg light $B_k$. The quotient $S_u/S_o$ of the signals of the two channels is shown in FIG. 2C as a function of the Bragg wavelength, corresponding to the maximum of the particular momentary response $B_k$. There is a pronounced drop that would only allow signal evaluation with limited accuracy. For this reason the quotient is logarithmized. The logarithmic ratio signal $LV=\log(S_u/S_o)$ is shown in FIG. 2D as a function of the Bragg wavelength. The LV response represents the calibration curve for measurements with the FBG sensor, as explained below with reference to the flowchart in FIG. 3.

Figure 3:
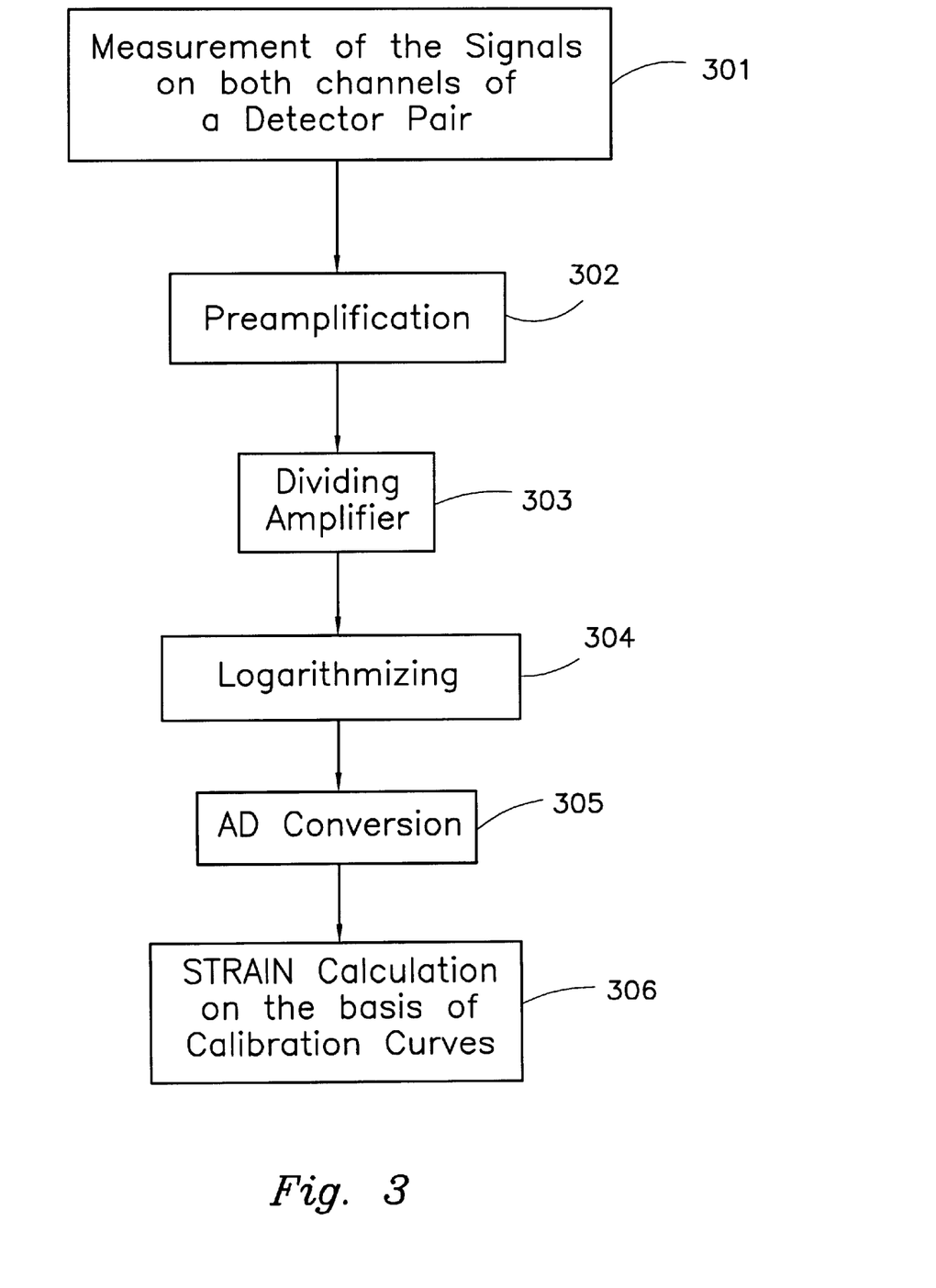
FIG. 3 is a flow chart depicting the method of signal processing in accordance with this invention.

In the process of strain measurement, for example, with a Bragg grating as in FIG. 3, the intensity signals are first measured by the detector elements on two channels of a detector pair (step 301). The detector signals are preamplified (step 302), ratioed (step 303) and logarithmized (step 304). For this purpose there is a dividing amplifier and a logarithmizer, forming parts of each LLR circuit (see FIG. 1B). The logarithmized ratio signal (LV) is applied to an analog/digital converter (step 305), after which the momentary Bragg wavelength can be determined direct by comparison with the calibration curve according to FIG. 2D (step 306). Because of the linear characteristic of the Bragg grating, the corresponding strain value is produced by the momentary Bragg wavelength, the Bragg wavelength of the grating in the ground state and the strain factor describing the wavelength shift proportional to strain or compression.

If an array of detector pairs is used according to FIG. 1B, the steps 301 through 306 can be implemented simultaneously for each pair of detector channels. Alternatively it is possible to provide a common LLR circuit for all detector pairs, the Bragg wavelengths then being sampled serially. In the example of spectral responses according to FIG. 2A, the detector arrangement of the invention achieves wavelength resolution of approx. 0.05 pm.

Preferred applications for the invention are in all areas of strain measurement for locally resolved detection of stress on extensive structures in construction engineering for example. In a corresponding manner it is also possible to detect temperature profiles or parameters derived from them.

A relatively simply constructed and fast responding detection system is produced by using detector/filter combinations, as described by Y.-J. Rao for instance and outlined in FIG. 4 (state of the art). Here the Bragg wavelength of a single Bragg grating is determined as follows with the aid of the transmission, as a function of wavelength, of edge filters or socalled WDM fiber couplers.

In the setup according to FIG. 4A, a detector configuration 10' comprises a fiber coupler 11' for coupling out light, reflected by a single Bragg grating in the FBG sensor 20', to a fiber coupler 12', on which the coupled out light is split into two fiber components. The light in the fiber components is detected by two detector elements 13' and 15', of which one detector element 13' features an edge filter 14' with a linear edge characteristic. The wavelength is determined by an evaluator circuit 17'. Irradiation of the light source 30' into the FBG sensor 20' is followed by simultaneous detection by the detector elements 13' and 15'. As a result of the linear relationship between the wavelength shift caused by the Bragg grating and the filter transmission (see graphic inserted in FIG. 4A), the intensity measured on detector 13', allowing for the reference detector 15', is a measure for evaluation of the wavelength shift. The edge filter characteristic according to FIG. 4A presents the following disadvantages. Achieving a sufficiently large measurement range, within which the wavelength shift as a function of strain occurs, requires a sufficiently slow rising of the filter characteristic, which is detrimental to detector resolution. Thus the previously mentioned resolution of 50 pm is difficult to implement with a linear edge filter for example. Furthermore, the transmission characteristic of the edge filter is dependent on temperature, meaning that extra measures are necessary for temperature stabilization.

Figure 4B:
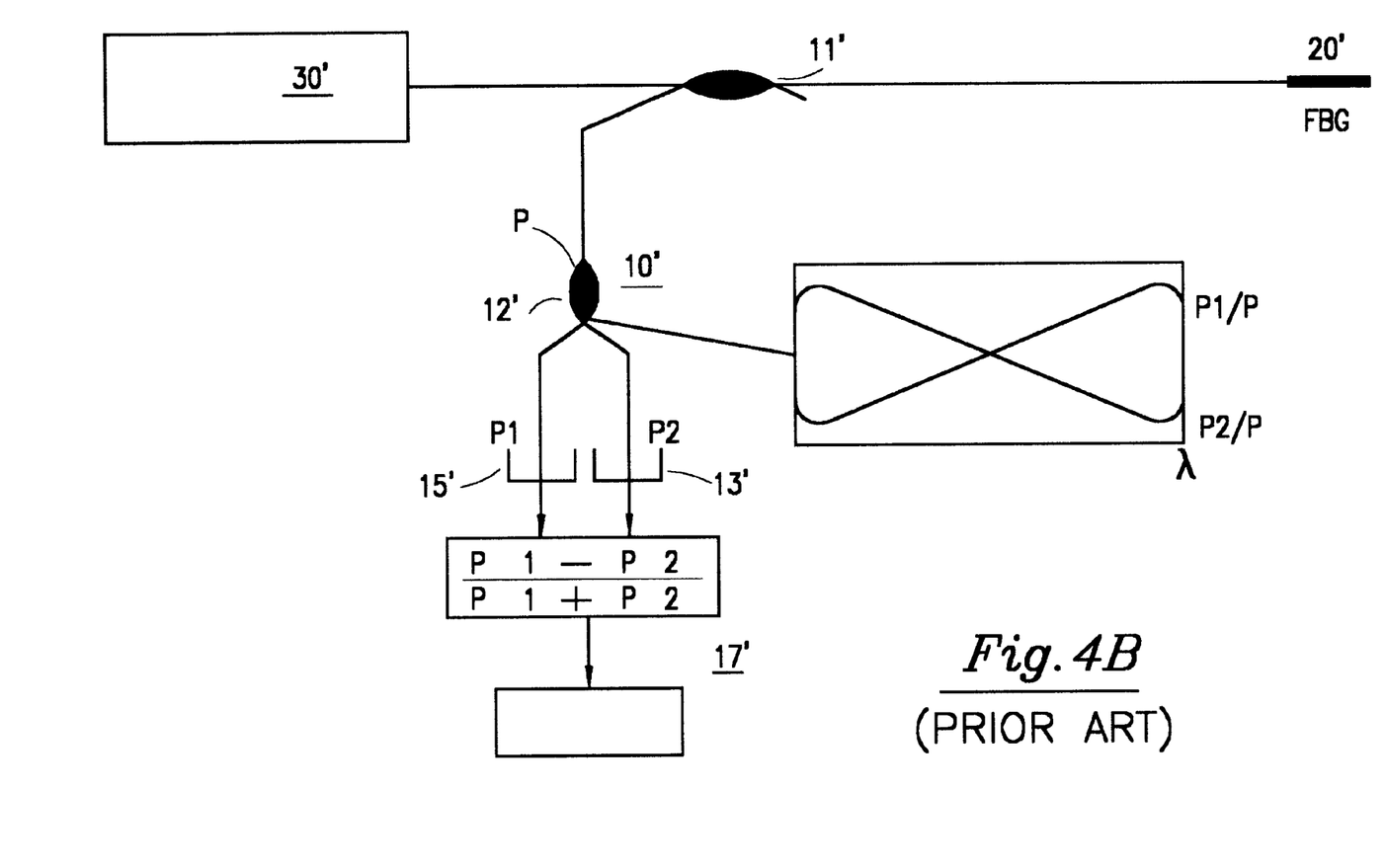

In an alternative detection system according to FIG. 4B, a fiber coupler 12' with a transmission function dependent on wavelength is used instead of the linear edge filter. A light source 30' irradiates the FBG sensor 20' and the light reflected by the single Bragg grating in the FBG sensor is coupled by fiber coupler 11' into the socalled WDM fiber coupler 12', whose output characteristic is illustrated by the inserted curve. The output intensities P1, P2 are detected by the detectors 13' and 15' and processed by determining the ratio of the difference and the sum of the two output intensities P1, P2. Use of the WDM fiber coupler is a disadvantage, because it can only evaluate one Bragg grating, while in practical applications a large number of Bragg gratings are contained in each FBG sensor. Furthermore, as in the case of the edge filter, the wavelength resolution of the system according to FIG. 4B is restricted by the linear fiber coupler characteristic.

In contrast, this invention presents the following advantages. The combination of a plurality of detector arrangements according to the invention allows simultaneous, locally resolved evaluation of FBG sensor signals at high measurement frequencies, without the need for a costly wavelength demultiplexer system. It is possible to use standard, i.e. readily available, highly sensitive detector elements, eg InGaAs detector elements. As a result of the narrowband sensitivity characteristic of the detectors, higher resolution is achieved, compared to the conventional use of linear edge filters, and without loss of data processing speed. The detector pairs assigned to a Bragg grating can be spaced in any way to reduce or eliminate crosstalk between the sensor signals of different Bragg gratings. Thus the accuracy and reproducibility of signal evaluation are further enhanced. Wavelength measurements in the kHz region are possible with spectral resolution in the pm region.

Although the invention has been described with reference to specific forms of apparatus and method steps, various equivalents may be substituted without departing from the spirit and scope of the invention defined in the appended claims. Additional embodiments and modifications which represent equivalents of the invention can be envisioned by one of ordinary skill in the art in light of this teaching.

What is claimed is:

1. A wavelength detector configuration for detecting the Bragg wavelength of a plurality of Bragg gratings in at least one FBG sensor, in which light reflected by said Bragg gratings is conducted by one fiber coupler into a distributor fiber coupler being arranged for distributing said reflected light to a plurality of pairs of detector channels, each pair of detector channels corresponding to one of said Bragg gratings and each channel containing a detector whereby an evaluator device with a processing and computing circuit is provided for determining quotients of the detector signals of each channel pair and for determining said Bragg wavelengths for each channel pair from said quotients wherein said detectors of each pair of detector channels exhibit narrow band spectral sensitivities that overlap with one another and whose central wavelengths of maximum sensitivity span a wavelength range containing the Bragg wavelength of the corresponding Bragg grating.

2. The wavelength detector configuration according to claim 1, in which each detector comprises a detector element and a filter with a narrowband transmission characteristic.

3. The wavelength detector configuration according to claim 2, in which the narrowband filter is an interference filter.

4. The wavelength detector configuration according to claim 2, in which the narrowband filter is integrated into the fiber coupler.

5. The wavelength detector configuration according to claim 1, in which each detector consists of a detector element and a Bragg grating whose Bragg wavelength corresponds to the central wavelength of the detector.

6. The wavelength detector configuration according to claim 1, wherein each detector pair of each detector channel is connected to a divider and logarithmizing circuit, which is part of the evaluator device.

7. An apparatus for strain measurement comprising at least one FBG sensor, containing at least one Bragg grating, and with a wavelength detector configuration according to claim 1.

8. A method for measuring the Bragg wavelength of at least one Bragg grating with a wavelength detector configuration according to claim 3, in which a quotient is formed of the detector signals of the detector elements and the Bragg wavelength is determined by comparison of the quotient of the detector signals with a computed calibration curve.

9. The method according to claim 8, wherein the formation of the quotient comprises division of the detector signals to form a linear quotient followed by logarithmizing of the linear quotient.

10. A method for measuring the Bragg wavelength of at least one Bragg grating with a wavelength detector configuration according to claim 4, in which a quotient is formed of the detector signals of the detector elements and the Bragg wavelength is determined by comparison of the quotient of the detector signals with a computed calibration curve.

11. The method according to claim 10, wherein the formation of the quotient comprises division of the detector signals to form a linear quotient followed by logarithmizing of the linear quotient.

12. A method for measuring the Bragg wavelength of at least one Bragg grating with a wavelength detector configuration according to claim 5, in which a quotient is formed of the detector signals of the detector elements and the Bragg wavelength is determined by comparison of the quotient of the detector signals with a computed calibration curve.

13. The method according to claim 12, wherein the formation of the quotient comprises division of the detector signals to form a linear quotient followed by logarithmizing of the linear quotient.

14. A method for measuring the Bragg wavelength of at least one Bragg grating with a wavelength detector configuration in which light reflected by each Bragg grating is conducted by fiber couplers into two detector channels, each containing a detector, whereby an evaluator device is provided to detect the signals of the detectors and to determine the Bragg wavelength from a quotient of the detector signals, wherein the detectors of each paid of detector channels exhibit narrow band spectral sensitivities that overlap with one another and whose central wavelengths of maximum sensitivity span a wavelength range containing the Bragg wavelength of the corresponding Bragg grating, said Bragg wavelength being determined by comparison of the quotient of the detector signals with a computed calibration curve.

15. The method according to claim 14 wherein the formation of the quotient comprises division of the detector signals to form a linear quotient followed by logrithmising of the linear quotient.

16. A method for measuring the Bragg wavelength of at least one Bragg grating with a wavelength detector configuration in which light reflected by each Bragg grating is conducted by fiber couplers into two detector channels, each containing a detector comprising a detector element and a filter with a narrowband transmission characteristic, whereby an evaluator device is provided to detect the signals of the detectors and to determine the Bragg wavelength from a quotient of the detector signals, wherein the detectors of each paid of detector channels exhibit narrow band spectral sensitivities that overlap with one another and whose central wavelengths of maximum sensitivity span a wavelength range containing the Bragg wavelength of the corresponding Bragg grating, said Bragg wavelength being determined by comparison of the quotient of the detector signals with a computed calibration curve.

17. The method according to claim 14 wherein each of said detectors comprise a detector element and a filter with a narrow band transmission characteristic.

* * * * *